March 25, 1952      F. H. RUED      2,590,466
MULTISTAGE SLEEVE VALVE
Filed Aug. 23, 1946      2 SHEETS—SHEET 2
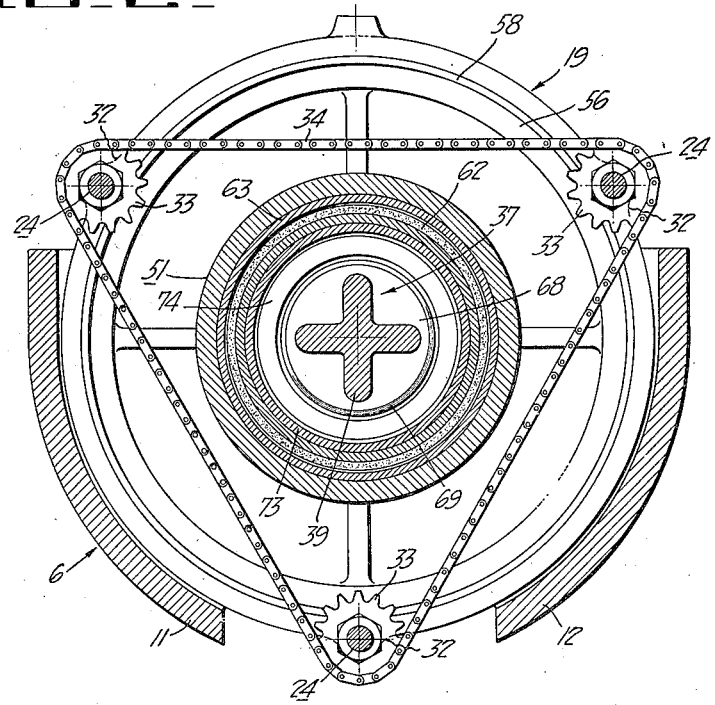
FIG_2_
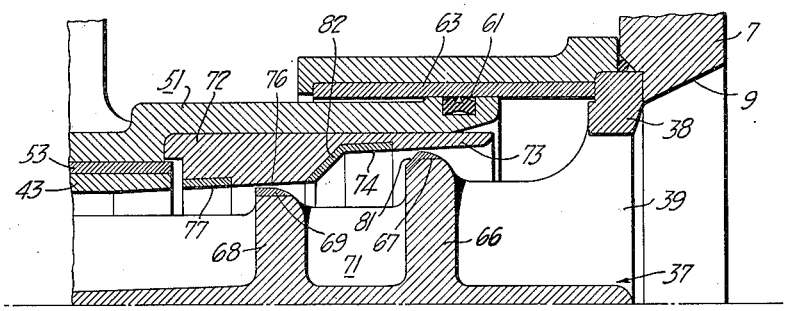
FIG_3_
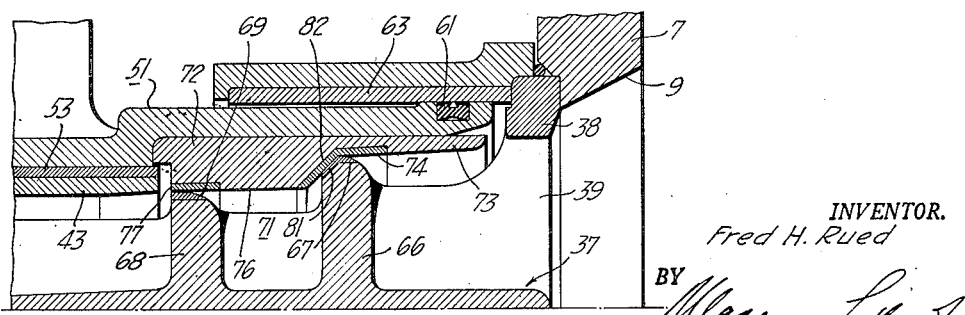
FIG_4_
INVENTOR.
Fred H. Rued
BY Patented Mar. 25, 1952

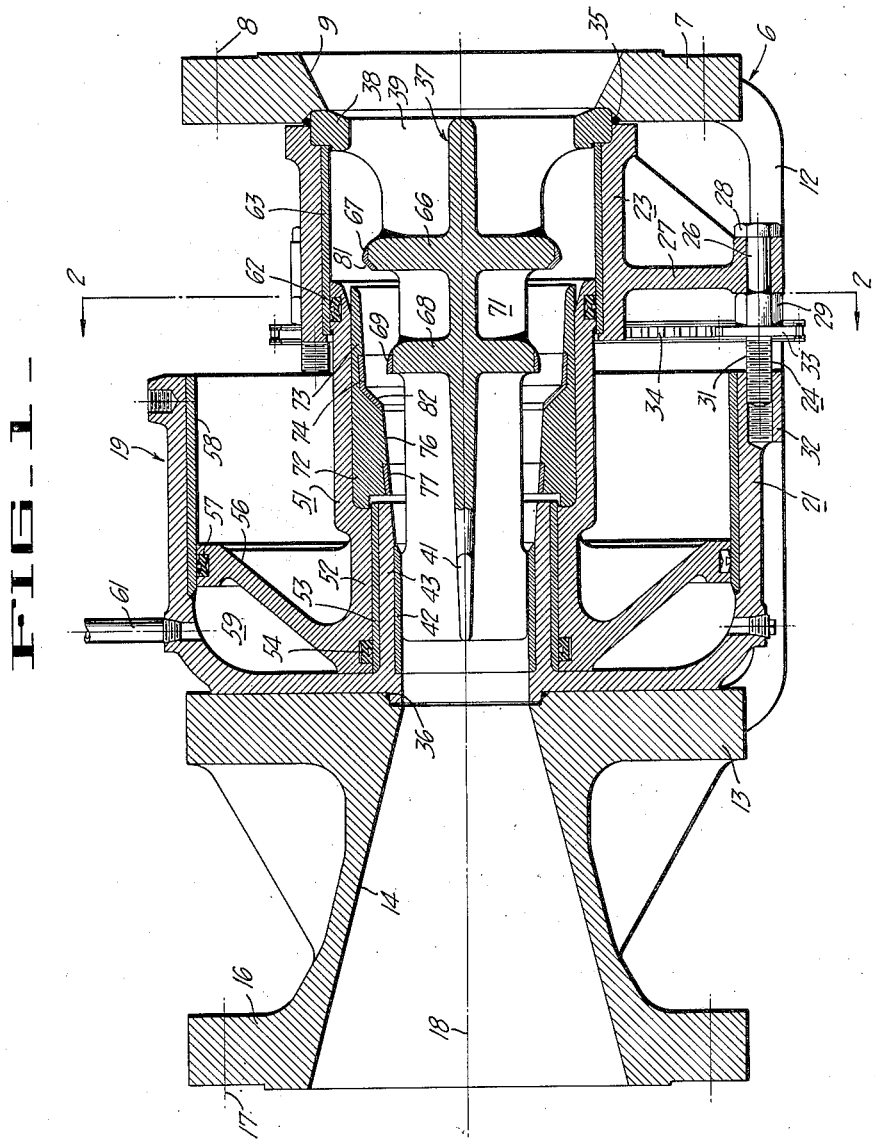

2,590,466

UNITED STATES PATENT OFFICE 2,590,466

MULTISTAGE SLEEVE VALVE

Fred H. Rued, Lafayette, Calif., assignor to The Pelton Water Wheel Company, San Francisco, Calif., a corporation of California Application August 23, 1946, Serial No. 692,446

7 Claims. (Cl. 251—78)

My invention relates to means for controlling fluid flow particularly hydraulic flow in pipe lines and is especially concerned with a valve for use in relatively large installations for reducing the pressure from the upstream side to the downstream side and for accomplishing a substantial pressure difference therebetween as well as for interrupting the flow completely.

In large water works and similar hydraulic installations, there is often utilized a valve for the purpose of reducing pressure and for preventing fluid flow and in some instances there is especially indicated the use of a valve of the type shown in the co-pending application of Ira Morgan White, Serial No. 492,278, filed June 25, 1943 entitled "Valve," now Patent 2,416,787 of March 4, 1947.

In the mentioned White application, there is provided a cradle or casing of an interrupted peripheral extent which is insertable into a pipe line and which itself contains a movable element of a stream lined form adapted to be moved between an open position permitting free hydraulic flow and a closed position in which the movable element seats and effectuates a complete closure to preclude hydraulic flow.

It sometimes occurs in practice that the pressure drop across the valve is such that the valve in an intermediate position, that is in a position between fully opened and fully closed positions, is susceptible to a hydraulically induced vibration customarily or often of a sonic or audible frequency. This vibration is not only unpleasant, but is indicative of deleterious forces accompanying the reduction in the pressure of the fluid in a way which is destructive of the valve itself. In fact the service life of a valve in which this sonic vibration occurs is so short as to be uneconomic.

It is therefore an object of my inention to provide a hydraulic valve in which pressure reduction is accomplished without deleterious vibration.

Another object of my invention is to provide a valve of the seating type capable of reducing the pressure of a hydraulic fluid between the upstream side and the downstream side in a fashion precluding deleterious effects upon the valve.

A further object of my invention is in the general to improve pressure reducing valves.

An additional object of the invention is to provide a valve of the sleeve type in which the motion of the sleeve is smooth and continuous as distinguished from vibratory.

Other objects of the invention are obtained in the embodiment thereof shown in the accompanying drawings in which Figure 1 is a cross section on a central transverse plane of a multi-stage sleeve valve constructed in accordance with my invention, the valve being shown in fully open position.

Figure 2 is a cross section the plane of which is indicated by the line 2—2 of Figure 1.

Figure 3 is a detail to an enlarged scale of a portion only of the interior construction of the valve showing the parts in an intermediate or part-closed position.

Figure 4 is a view comparable to Figure 3 but showing the parts in fully closed position.

In its preferred form, the multi-stage sleeve valve of my invention includes a cylindrical casing adapted for installation in a pipeline and having a central stem over which slides a sleeve disposed within the casing. Cooperating with a plurality of throttling discs on the stem is a plurality of throttling portions on the sleeve arranged to be moved with the sleeve to establish a cooperating relationship with the discs and to establish annular passages between the portions and the discs. Flow through the annular openings is such that the downstream pressure beyond each opening is substantially half of the upstream pressure in advance of the opening. Additionally there is provided a valve seat and a seating ring on the stem and sleeve so that in one position the flow over the discs and between the seat and ring is prevented.

In the particular embodiment of the invention selected for illustration herein, there is provided a cradle or framework 6 having an upstream flange 7 provided with a bolt circle 8 designed for connection of the flange to a cooperating flange (not shown) on the upstream portion of a connected hydraulic line. The flange 7 is provided with a central aperture 9 accommodating appropriate fluid flow and is also equipped with webs 11 and 12 extending between the flange 7 and a comparable flange 13 in alignment therewith but spaced therefrom. Merging with the flange 13 by means of an intermediate Venturi section 14 is a downstream flange 16. This is provided with a bolt circle 17 for the reception of fastenings for securing the flange 16 against a cooperating flange (not shown) on a downstream section or continuation of the hydraulic pipeline. The entire pipeline and cradle structure is thus maintained in alignment on a central axis 18.

Adapted to be removably situated in the space between the flanges 7 and 13, is a casing generally designated 19 and having a downstream portion 21 and an upstream portion 23. These portions are individual pieces which are movable toward and away from each other by means of a plurality of jack screws 24. Each of the jack screws includes a bearing portion 26 journaled in a web 27 of the upstream portion 23 and confined against axial translation by a head 28 and a non-circular boss 29. Extending beyond the boss 29 is threaded stem 31 screwed into an appropriately threaded socket 32 formed in the downstream section 21. By rotating the screw jack upon application of a tool to the boss 29, the upstream portion 23 and the downstream portion 21 can be caused to approach each other so that their overall dimension axially is less than the distance between the flanges 7 and 13. These portions together can then be withdrawn laterally or transversely from the section, or if the screw jacks are turned in the reverse direction after these portions have been interposed between the flanges 7 and 13, they can be expanded into tightly abutting relationship therewith.

Since preferably three equally spaced screw jacks are utilized, I provide means for simultaneously rotating all of them in the same sense or direction in order to impose a uniform motion on all parts of the structure. For that purpose each of the jack screws is provided with an integral sprocket 33 and all of the sprockets are encompassed by a sprocket chain 34. Thus, when any one of the heads 29 is rotated, all of the jack screws are simultaneously actuated and in the same sense. With this arrangement, when the jack screws are tightened, the upstream section 23 is caused to approach the flange 7 and jam a packing ring 35 into position deforming it sufficiently to provide a fluid tight joint. In a similar fashion, a packing ring 36 interposed between the downstream section 21 and the flange 13 is adequately deformed to provide a tight connection with the flange 13.

Not only is the pressing action of the upstream portion 23 against the flange 7 utilized to effectuate compression of the packing 35, but this force is likewise utilized to secure in place a central stationary stem 37. This stem is a symmetrical body disposed co-axially with the axis 18. It is formed on its upstream end to provide a ring 38 suitably received and appropriately guided between the end of the section 23 which is recessed for the purpose and the flange 7 which is comparably recessed. Thus the ring 38 and the stem 37 are rigidly although removably mounted. The length of the stem 37 is such that when released it can be slightly displaced from the flange 7 and retracted transversely from a position between the flanges 7 and 13.

The stem ring 38 is formed integrally with a plurality of webs 39 together constituting a body cruciform in cross section and extending to a terminus 41. The end of the stem is exteriorly received within a non-corroding sleeve 42 seated in a central annulus 43 integrally incorporated in the structure of the downstream section 21. With this arrangement, the stem 37 is always readily removable from and insertable into the sleeve 42 despite protracted use and wear and yet is always held in accurate axial alignment therewith. In the structure as so far described, there is provided a substantially unobstructed path for fluid flow from the upstream flange 7 to the downstream flange 19 with a diversion occasioned by the stem 37.

To cooperate with the stem 37 in performing a valving function, there is provided a sleeve generally designated 51 arranged for sliding movement with respect to the casing 19, that is with respect both to the downstream section 21 and to the upstream section 23 thereof. The sleeve 51 adjacent its downstream end is provided with a cup 52 adapted to act as a cylinder in sliding upon a bushing 53 surrounding the cup 43 and having a packing 54 to preclude leakage between the cup 52 and the bushing 53. Additionally the sleeve is enlarged into a piston 56 having a packing ring 57 around the periphery thereof and engaging an interior bushing 58 lining the downstream section 21 in itself forming a cylinder. Since the packings 57 and 54 effectuate a fluid tight closure between the piston portion 56 and the interior 59 of the downstream portion 21, there is afforded a chamber for assisting in operating the sleeve 51. To govern the pressure acting on the piston portion 56, communicating with the chamber 59 is a conduit 61 connected through suitable valving (not shown) to a source of fluid under pressure and to drain alternately.

The sleeve 51 on its other or upstream end is slightly enlarged to receive a packing ring 62 and to engage a lining 63 constituting a cylinder disposed within the upstream portion 23 of the casing 19. Since the portion of the sleeve adjacent the packing 62 is always exposed to substantially the full upstream pressure, and since its diameter and area are less than the diameter and area of the piston portion 56, it is possible by opening the conduit 61 to downstream or atmospheric pressure to have the valve opened by the upstream pressure exerting its force against the exposed portion of the sleeve 51. If the upstream pressure itself or some other relatively high pressure is exerted through the conduit 61 upon the piston 56, the greater resulting force overcomes the force upon the upstream end and causes the sleeve 51 to move toward the upstream end and toward or into closed position.

With the arrangement as so far described, the sleeve 51 is translated by hydraulic pressure between a downstream, open position as shown in Figure 1 and an opposite or upstream, closed position.

In order that the sleeve will operate as desired in its intermediate travel, I preferably provide means for reducing the pressure through the valve not by a single stage but preferably by two or more stages. Further, I provide means so that the valve also acts as a complete closure. As a result of experimentation in connection with a valve of the approximate configuration disclosed herein, I have determined that no deleterious sonic vibration occurs when the pressure drop through the valve is divided sufficiently so that the upstream pressure across a valve seat does not exceed about twice the downstream pressure on that seat. Thus when the upstream pressure and the downstream pressure are known initially it is possible to select the number of stages of valving to be utilized by maintaining the selected relative ratio of upstream and downstream pressures per stage. In the present instance, there are two such stages and for that reason the stem 37 is enlarged on its upstream portion to provide a disc 66 having a hard-faced periphery 67 in order to reduce the wear due to abrasives in the fluid and is likewise provided with a second disc 68 similarly supplied around its periphery with a hard facing 69 for a similar reason. The discs 66 and 68 are spaced apart along the axis of the stem 37 in order to define a chamber 71 therebetween. This chamber is not entirely unobstructed being in part filled by the fins or flanges of the cruciform stem in the present instance, but it does not constitute a common volume between the flanges 66 and 68.

Designed to cooperate with the two discs 66 and 68 is a cuff 72 appropriately mounted in the sleeve 51 and confined to move therewith. The cuff 72 has a tapered portion 73 in which a wear-resisting insert 74 is provided and similarly is provided with a reduced diameter, conical or tapered portion 76 itself having a wear-resistant insert 77. The relative position and diameter of the inserts 74 and 77 with respect to the diameter and position of the peripheral facings 67 and 69 on the discs are such that when the sleeve 51 and correspondingly the cuff 72 is moved to the right in Figure 1, or toward valve closing position, there are defined two annular openings between the respective sleeve insert portions and the discs. These two openings act as throttle passageways for the restricted conduct of the hydraulic fluid flowing through the valve. The restrictions provided by these openings are both gradually increased as the sleeve moves toward the right or toward the upstream end, but in every instant position the area of each annular opening is such that the pressure on the downstream side thereof is substantially half the pressure on the upstream side thereof. The effect of the chamber 71 between the discs is to permit conversion of kinetic energy of the fluid passing through the first annular opening so that the pressure drop through it is as indicated and so that a similar throttling action can take place through the ensuing annular opening around the disc 68.

Fluid passing over the disc 68 then flows along the stem 37 and finally through the Venturi portion 14 downstream.

As the sleeve 51 moves in an upstream direction toward closed position, the inserts 74 and 77 approach the discs closer and closer but never come into actual physical contact therewith. When the amount of flow through the valve has been sufficiently reduced, and when the annular openings are nearly negligible in area, it is possible to change from a multi-stage throttling operation to a single-stage final throttling operation without objectionable vibration. There is no seating arrangement provided in connection with the disc 68 and its cooperating sleeve portion 77, but there is provided a seating mechanism in connection with the disc 66 and adjacent sleeve portion 74. The disc 66 is provided with a hard facing 81 which may in fact be a continuation of the peripheral facing 67 but is of a conical contour having a greater convergence. Designed to mate with or abut the portion 81 is a valve seating ring 82 of wear-resistant material having the same conical convergence as the portion 81 and designed to be brought into abutment with it with sufficient pressure to preclude any hydraulic flow through the valve. The abutment of the portions 81 and 82 serves also as a stop for any further closing motion or upstream motion of the valve.

When the valve is initially opened, the sleeve 51 moves toward the left in Figure 1 or toward the downstream side and initially the flow is entirely controlled by the single-stage throttling occurring between the seats 81 and 82. No difficulty with sonic vibration has been experienced when the flow is as slight as occurs initially. Promptly after the flow has started however, the throttling effect occurring between the facing 69 and the sleeve portion 77 and between the facing 67 and the portion 74 is effective to provide a multi-stage pressure reduction preclusive of the generation of sonic vibration.

In accordance with the invention therefore, there is provided a multi-stage sleeve valve which can be introduced into and withdrawn transversely of a hydraulic line and which is effective to be actuated hydraulically from a remote point from an open position to a closed position and vice versa and to be held in any intermediate position for protracted operation. There is provided a valve in which during most of the intermediate travel or positioning of the valve the pressure drop across the valve is accomplished in a plurality of stages so that no deleterious strains are set up and in which the final closing or initial opening movement is accomplished but by a single stage.

I claim:

1. A multi-stage sleeve valve comprising a cylindrical casing, a central stem in said casing, a sleeve surrounding said stem and slidable within said casing, a plurality of axially spaced throttling discs on said stem, a plurality of interiorly conical throttling portions on said sleeve movable with said sleeve into simultaneous throttling relationship with said discs, a stop for said sleeve on said stem, and an abutment on said sleeve independent of said throttling portions for engaging said stop with said throttling portions spaced from said discs.

2. A multi-stage sleeve valve comprising a cylindrical casing, a central stem in said casing, a sleeve surrounding said stem and slidable within said casing, a plurality of throttling discs on axially spaced apart said stem, a valve seat on one of said discs, a plurality of axially spaced interiorly conical throttling portions on said sleeve simultaneously movable with said sleeve into close but spaced simultaneous throttling relationship with said discs, and a seating ring on said sleeve movable with said sleeve into abutting relationship with said valve seat with said throttling portions spaced from said discs.

3. A multi-stage sleeve valve comprising a casing, discs within said casing spaced apart to define a chamber between them, a sleeve movable within said casing and having a plurality of conical portions overlying said discs in close but spaced cooperating relationship therewith to control flow over said discs into and out of said chamber, and abutting seats on said sleeve and on one of said discs and independent of said conical portions for stopping flow into said chamber.

4. A multi-stage sleeve valve comprising a casing for installation in a hydraulic line, discs within said casing spaced apart to define a chamber therebetween, a sleeve movable within said casing, conical portions on and movable with said sleeve into positions with respect to said discs to define simultaneously and correspondingly variable annular openings for throttling hydraulic flow both into and out from said chamber, the spacing of the upstream one of said conical portions from the adjacent one of said discs in all positions thereof being less than the corresponding spacing of the downstream one of said conical portions from its disc, and abutting surfaces on said sleeve and on one of said discs to stop relative approaching movement of said sleeve and said discs.

5. A multi-stage sleeve valve comprising a casing, discs within said casing spaced apart to define a chamber, a sleeve movable within said casing, conical portions on said sleeve movable therewith simultaneously to encompass said discs for simultaneous and corresponding variable amounts of throttling, a valve seat on one of said discs facing said chamber, and a sleeve seat on said sleeve and independent of said conical portions engageable with said valve seat.

6. A multi-stage sleeve valve comprising a casing, a stem, a plurality of discs within said casing axially spaced apart on said stem to define a chamber between them, a sleeve surrounding said stem and movable within said casing, conical portions on and movable with said sleeve toward said discs to define therewith simultaneously and correspondingly variable annular openings for throttling flow into and out from said chamber, a stop on said stem, and a stop portion of said sleeve in addition to said conical portions for abutment with said stem stop.

7. A multi-stage sleeve valve comprising a casing for installation in a hydraulic line, a stem supported on said casing in an axial position therein, radial discs on said stem within said casing and spaced axially apart to define a chamber between them, a sleeve encompassing said discs and movable axially within said casing, conical portions within said sleeve spaced axially apart to define annular openings between said portions and said discs, a stop on said stem, and a stop portion on said sleeve independent of said conical portions for abutment with said stem stop.

FRED H. RUED.

REFERENCES CITED

The following references are of record in the file of this patent:

UNITED STATES PATENTS

| Number | Name | Date |
| --- | --- | --- |
| 21,433 | McCray | Sept. 7, 1858 |
| 1,373,360 | Sharkey | Mar. 29, 1921 |
| 1,932,196 | Stuebing | Oct. 24, 1933 |
| 1,943,401 | Thomas | Jan. 16, 1934 |
| 2,395,633 | Livers | Feb. 26, 1946 |